United States Patent
Beaucher

(10) Patent No.: US 11,766,887 B2
(45) Date of Patent: Sep. 26, 2023

(54) WRITING INSTRUMENT

(71) Applicant: SOCIÉTÉ BIC, Clichy (FR)

(72) Inventor: Laurent Beaucher, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 17/459,354

(22) Filed: Aug. 27, 2021

(65) Prior Publication Data

US 2022/0063323 A1 Mar. 3, 2022

(30) Foreign Application Priority Data

Aug. 27, 2020 (EP) ..................................... 20305954
Oct. 26, 2020 (EP) ..................................... 20306280

(51) Int. Cl.
 *B43K 29/02* (2006.01)
 *B43K 7/00* (2006.01)
 *B43K 8/00* (2006.01)
 *B43K 8/02* (2006.01)

(52) U.S. Cl.
 CPC .............. *B43K 29/02* (2013.01); *B43K 7/005* (2013.01); *B43K 8/003* (2013.01); *B43K 8/024* (2013.01)

(58) Field of Classification Search
 CPC ........ B43K 29/02; B43K 7/005; B43K 8/003; B43K 8/024; B43K 29/00; B43K 5/16
 USPC ...................................... 401/195, 52, 29–33
 See application file for complete search history.

(56) References Cited

U.S. PATENT DOCUMENTS

| | | | |
|---|---|---|---|
| 1,473,090 A * | 11/1923 | Ferry ..................... | B43K 29/02 15/428 |
| 2,069,462 A | 2/1937 | Rouse | |
| 2,587,380 A | 2/1952 | Polynice | |
| 2,637,900 A | 5/1953 | Thompson | |
| 2,815,002 A | 12/1957 | Charley | |
| 5,127,130 A * | 7/1992 | Copito ................... | B43K 29/02 15/431 |
| 5,389,717 A | 2/1995 | Santini et al. | |

(Continued)

FOREIGN PATENT DOCUMENTS

| EP | 0556668 B1 | 11/1995 |
|---|---|---|
| EP | 2977416 B1 | 7/2016 |

(Continued)

OTHER PUBLICATIONS

Extended European Search Report dated Jan. 21, 2021 in European Patent Application No. 20305954.8 (8 pages).

(Continued)

*Primary Examiner* — David J Walczak
(74) *Attorney, Agent, or Firm* — Bookoff McAndrews, PLLC

(57) ABSTRACT

An erasable ink writing instrument comprising a body extending along an axis, the body having a first end and a second end opposed to the first end along the axis, the first end being provided with a writing tip and with an eraser, wherein the writing tip is fed with erasable ink, wherein the writing tip is fixed with regard to the body and the eraser is movable along the axis with regard to the body, and the erasable ink writing instrument further comprising a helical-cam propelling mechanism configured to move the eraser along the axis between a retracted position and a protruding position. The erasable ink is a peelable ink and the eraser is a friction body.

20 Claims, 4 Drawing Sheets

(56) References Cited

U.S. PATENT DOCUMENTS

| | | | |
|---|---|---|---|
| 5,413,428 A | 5/1995 | Kageyama | |
| 5,855,442 A * | 1/1999 | Keller | B43L 21/04 |
| | | | 15/431 |
| 6,979,142 B1 | 12/2005 | Chmelar | |
| 9,409,438 B2 | 8/2016 | Ohtsuka | |
| 10,315,833 B2 | 6/2019 | Erdmann et al. | |
| 2005/0234150 A1 | 10/2005 | Omatsu et al. | |
| 2006/0069183 A1 | 3/2006 | Kurihara et al. | |
| 2006/0153626 A1 | 7/2006 | Mook et al. | |
| 2022/0063323 A1 | 3/2022 | Beaucher | |

FOREIGN PATENT DOCUMENTS

| | | | |
|---|---|---|---|
| JP | S6360104 A | 3/1988 | |
| JP | 05279614 A | 10/1993 | |
| JP | 03027484 B2 | 4/2000 | |
| JP | 2002-265843 A | 9/2002 | |
| JP | 2003-221542 A | 8/2003 | |
| JP | 2004143213 A | 5/2004 | |
| JP | 2004143381 A | 5/2004 | |
| JP | 2009-184279 A | 8/2009 | |
| JP | 2011-230439 A | 11/2011 | |
| WO | 94/10251 A1 | 5/1994 | |
| WO | 2005/120862 A2 | 12/2005 | |

OTHER PUBLICATIONS

Extended European Search Report dated Mar. 29, 2021 in European Patent Application No. 20306280.7 (5 pages).
"Bic Duo Ball Pen / Highlighter, Refillable, Black, 6 Pen/Highlighters" Amazon Listing, http://web.archive.org/web/20210826202048/https://www.amazon.com/BIC-Highlighter-Refillable-Black-Highlighters/dp/B000F2PEA4/ref=cm_cr_arp_d_product_top (archived Aug. 26, 2021).
Google Patents entry for JP3027484B2 <https://patents.google.com/patent/JP3027484B2/en?oq=JP3027484B2> (retrieved Aug. 27, 2021).
Search Report issued in corresponding International Application No. PCT/EP2021/058050, dated Jun. 28, 2021.
Search Report issued in corresponding European Application No. 20 16 7377, dated Aug. 25, 2020.

* cited by examiner

WRITING INSTRUMENT

This application claims priority from European patent application No. 20305954.8, filed Aug. 27, 2020, and from European patent application No. 20306280.7, filed on Oct. 26, 2020; their contents being incorporated herein by reference.

TECHNICAL FIELD

The present disclosure relates to an erasable ink writing instrument provided with an eraser disposed at the front end.

TECHNICAL BACKGROUND

Traditional retractable erasable ink writing instrument are usually provided with an eraser disposed at the rear end, onto the button for actuating the writing tip. However, when the button is actuated in order to project/retract the writing tip, the user contacts the eraser with his fingers/thumb and makes it dirty. A solution consists in providing a protective cap for the eraser. However, such an additional cap has a negative impact on the manufacturing costs while it is often lost by the user. Another solution is to place the eraser at another place on the writing instrument. However, the resulting structure is usually complex and presents a relatively big size which is not user-friendly. Therefore a need exists to provide a user-friendly erasable ink instrument having an eraser which is prevented from being touched by the user and a writing tip which may be easily protected when not used.

SUMMARY

In embodiments, an erasable ink writing instrument comprises a body extending along an axis, the body having a first end and a second end opposed to the first end along the axis, the first end being provided with a writing tip and with an eraser, wherein the writing tip is fed with erasable ink, wherein the writing tip is fixed with regard to the body and the eraser is movable along the axis with regard to the body, and the erasable ink writing instrument further comprises a helical-cam propelling mechanism configured to move the eraser along the axis between a retracted position and a protruding position. The erasable ink is an aqueous peelable ink and the eraser is a friction body.

The first end is the front end and the second end is the rear end. The writing tip may be a felt tip, a ballpoint tip or any other element making it possible to write on a substrate or surface with an erasable ink. In the following, and unless otherwise specified, "writing instrument" should be understood as "erasable ink writing instrument".

The eraser can axially move with regard to the body and the writing tip cannot move (in normal use) with regard to the body.

In the protruding position the eraser may be able to be used for erasing while the writing tip may be not able to used for writing. In the retracted position the eraser may be not able to be used for erasing while the writing tip may be able to be used for writing. For example, in the protruding position, the eraser may protect the writing tip.

The eraser disposed on the first end and actuated by a helical-cam propelling mechanism may prevent the user from touching the eraser. The helical-cam propelling mechanism may permit to obtain a relatively simple structure and the writing instrument may have a relatively small size and may be ergonomic/easy to use. The retractable eraser disposed on the first end may provide the same effect as a retractable writing tip: the writing tip may be protected when not used and available for use by a simple actuation of an element of the writing instrument.

In embodiments, the eraser and the writing tip may be coaxial, the eraser being disposed around the writing tip, the writing tip comprising a writing end, and, when the erasable ink writing instrument is seen perpendicular to the axis, the writing end is concealed by the eraser when the eraser is in the protruding position and the writing end is free from the eraser when the eraser is in the retracted position.

The writing end is the portion of the writing tip which is applied on a substrate or surface for writing.

The eraser may form a sleeve around the writing tip and sliding along the axis in order to free the writing end for writing (i.e. in the retracted position) or to concealed the writing end for its protection when not used (in the protruding position). The eraser may have a tube shape.

In embodiments, the eraser may have a distal end, and the distal end may have a frustoconical shape.

In embodiments, the helical-cam propelling mechanism may comprise a first part having one of a helical cam and a cam follower and a second part having the other of the helical cam and the cam follower, and the first part is axially coupled in at least one direction with the eraser and the second part is fixed to the second end, inside the body.

In other words, the first part may have the helical cam and the second part the cam follower or the first part may have the cam follower and the second part the helical cam. The second part may not be able to move with regard to the second end. The first part may be axially coupled with the eraser in only one axial direction or in the two opposite axial directions. In other words, the eraser may move along the axis together with the first part in only one direction or in the two opposite directions.

The helical-cam propelling mechanisms as such are well known for the skilled person and are not disclosed in detail. For example, the helical cam may have any shape, any pitch, any angular stroke, etc.

In embodiments, the second part may be snap-fitted with the second end.

The second part may be removably or un-removably snap fitted with the second end.

In embodiments, the body may comprise a first portion having the first end and a second portion having the second end, the first portion and the second portion are rotatable relative to each other, and the first part is rotatably coupled with the first portion and axially movable with regard to the first portion.

The first part may turn around the axis together with the first portion and may remain free to move along the axis with regard to the first portion.

The relative rotation of the first portion with regard to the second portion may actuate the helical-cam propelling mechanism, due to which the eraser may be moved between the retracted position and the protruding position.

In embodiments, the first portion may be rotatably snap-fitted with the second portion.

In embodiments, the first part may comprise one of at least one axial projection and at least one axial recess, the first portion comprises the other of the at least one axial projection and the at least one axial recess, and the at least one axial projection and the at least one axial recess are slidably engaged with each other axially.

In other words, the first part may comprise the at least one axial projection and the eraser the at least one axial recess or the first part may comprise the at least one axial recess and the eraser the at least one axial projection. The number of axial projection(s) may be the same as the number of axial recess(es). Each axial projection may be engaged with an axial recess.

In embodiments, the erasable ink writing instrument may comprise a writing body having the writing tip, wherein the first part is hollow, a support extends inside the first part and is axially coupled with the second part, and the support supports the writing body.

The support may be not able to move along the axis with regard to the second part. The support may be snap-fitted or press-fitted to the second part. The support may be fixed or removable with regard to the second part.

For example, the writing body may be a cartridge.

In embodiments, the writing body may be removably mounted to the support.

In embodiments, the writing body may be press-fitted to the support.

In embodiments, the support and the second part may be unitarily/monolithically formed.

In other words, the support and the second part may form together a same and single piece.

In embodiments, the erasable ink writing instrument may comprise a writing body having the writing tip, wherein the eraser is mounted onto a tube holder, the eraser is axially coupled in at least one direction with the first part via the tube holder, and the writing body extends at least in part into the tube holder in any position of the eraser.

The eraser may be mounted onto an axial end of the tube holder, for example by snap-fitting or press-fitting, and the other axial end of the tube holder may be coupled in only one axial direction or in the two opposite axial directions with the first part. In a variant, the eraser may be mounted onto the axial end of the tube holder by being overmolded onto the axial end of the tube holder.

In embodiments, the erasable ink writing instrument may comprise a return spring configured to axially push the eraser toward the first part.

For example, the return spring may be a coil spring which works in compression.

In embodiments, the return spring may be configured to axially push the eraser from the extended position toward the retracted position while the eraser abuts against the first part axially.

In such a case, the eraser is coupled with the first part in only one axial direction. In embodiments, the tube holder may also be coupled with the first part in only one axial direction (i.e. the eraser is coupled with the first part in only one axial direction via the tube holder).

In embodiments, the erasable ink writing instrument may comprise a writing body having the writing tip, wherein the body comprises a nose cone, the nose cone comprises the first end, and the nose cone is removable, due to which the writing body is removable for refill.

For example the nose cone is screwed with the body. For example, the nose cone is screwed with the first portion.

In embodiments, the erasable ink may be an aqueous peelable ink and the eraser is a peeling body or a friction body.

An aqueous peelable ink is an ink that forms a removable layer on the substrate or surface onto with it is applied. A friction body is configured to remove or peel a layer of a peelable ink.

In examples, the aqueous peelable ink composition may include at least two film-forming elastomeric polymers wherein the first film-forming elastomeric polymer may be hydrogenated acrylonitrile butadiene rubber (HNBR), and wherein the second film-forming elastomeric polymer may be styrene butadiene rubber (SBR) and one or more pigments dispersed in water. Principle of working of the ink is that when the ink composition is applied to porous substrates, the water evaporates and the polymers provide a coalesced residue on the surface of the substrate. The fact that the ink composition is peelable results in that a residue can be removed from the surface of the substrate, for example a paper surface, for some period of time after formation without leaving a visible residue and/or damaging the substrate. Hence, the initial color (first color) of the ink composition after writing on a substrate can be removed by peeling, and the written mark changes into a second color. In examples, the first and second colors may be different which means that they can be distinguished from each other by the human naked eye. These ink compositions are particularly suitable for use with writing porous substrates or porous surfaces made, basically, of pressed, matted fibers, like paper or cardboard. The aqueous peelable ink composition may also be storage-stable, easy to manufacture, and easy to apply.

The aqueous peelable ink composition may have a low viscosity, in examples a low viscosity may range from 3 to 10 mPa·s, more specifically the low viscosity may range from 3 to 7 mPa·s, and as a result the aqueous peelable ink is particularly suitable for use with standard felt-tip markers that rely on a capillary feed system to draw ink from a reservoir. Thus, the aqueous peelable ink composition may be suitable for use in felt-pens, highlighters, markers, which typically use colored pigments. One aspect to using the ink composition as disclosed herein in markers is that when textbook pages are highlighted, the highlighted portions can be erased/peeled off later when the book is used by another reader.

Furthermore, ink compositions substantially as disclosed herein can be included in one single writing instrument. This allows having multiple color options within the same color mark, for example when the user takes notes, journal or draws to emphasize information or to make things stand out, which allows the user not to use multiple writing instruments.

Aqueous erasable writing ink compositions are known in the art such as in documents EP0556668B1 or JP03027484B2. Said aqueous ink compositions contain a film-forming elastomeric polymer and colorant. However, with this kind of erasable writing ink compositions, erasability may be difficult after a long period of time, and is thus sometimes not satisfactory. Furthermore, peelability of the ink compositions of the prior art requires significantly high pressure to obtain a good color-changing. In addition, the colors obtained with the ink compositions of the prior art are generally not very vivid.

Color-changing ink compositions capable of changing the color of the ink by an eraser are also known in the art such as in documents JP2002265843A or EP2977416B1. Said color-changing ink compositions contain a water-soluble resin, as well as pigment and dye. However, with this kind of color-changing ink compositions, peelability may be difficult after a long period of time, and is thus sometimes not satisfactory. Furthermore, peelability of the ink compositions of the prior art requires significantly high pressure to obtain a good color-changing. In addition, the colors obtained with the ink compositions of the prior art are generally not very vivid.

Patent application EP20306280.7 discloses a new aqueous erasable ink composition, more specifically a new erasable writing ink composition, enabling to obtain a good deposit which has, in particular, a satisfactory color intensity (vividness), a good peelability by mechanical action particularly when used on porous substrates, while avoiding an unwanted color loss due to a change in temperature and/or an unwanted color return. Efficient peelability of the written mark shall enable efficient removal of the initial color after peeling which means that the initial color is efficiently removed after peeling.

In examples, aqueous peelable ink compositions may use a hydrogenated acrylonitrile butadiene rubber (HNBR) as a first film-forming elastomeric polymer (a) in combination with styrene butadiene rubber (SBR) as a second film-forming elastomeric polymer (b), in combination with at least one pigment (c) dispersed in water (d). The aqueous peelable ink composition disclosed herein is thus peelable with fingers, thus using less waste than with conventional erasers. Furthermore, the aqueous peelable ink composition disclosed herein enables a change of color, in particular by applying a low pressure (by the user).

In addition, the aqueous peelable ink composition disclosed herein enables obtaining vivid colors of written marks once applied, especially on porous substrates, in particular the initial color as well as the second color (after peeling) are vivid. An additional aspect of the aqueous peelable ink as disclosed herein is the possibility to obtain an aqueous peelable ink composition with color-changing having a good cap-off time. The term "cap-off" designates the ability of the ink composition with color-changing of not drying up inside the writing instrument, which means in particular that the writing instrument can be left open for longer period of time, for example one hour or even several hours, or even more than one day according to some embodiments, in particular with removed cap, without drying up.

BRIEF DESCRIPTION OF THE DRAWINGS

Additional details and features of the disclosure are described with reference to the following figures in which.

DETAILED DESCRIPTION

Figure 1:
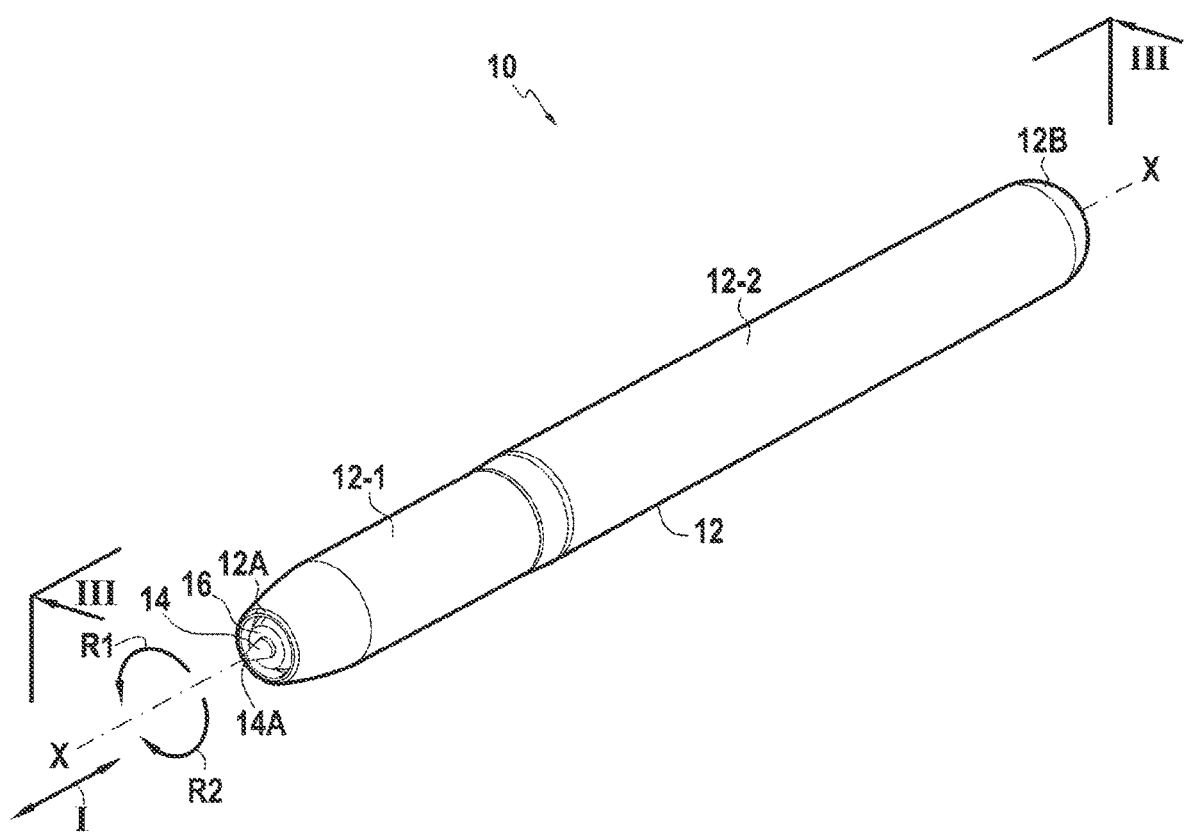
FIG. 1 shows an aqueous peelable ink writing instrument.
Figure 2:
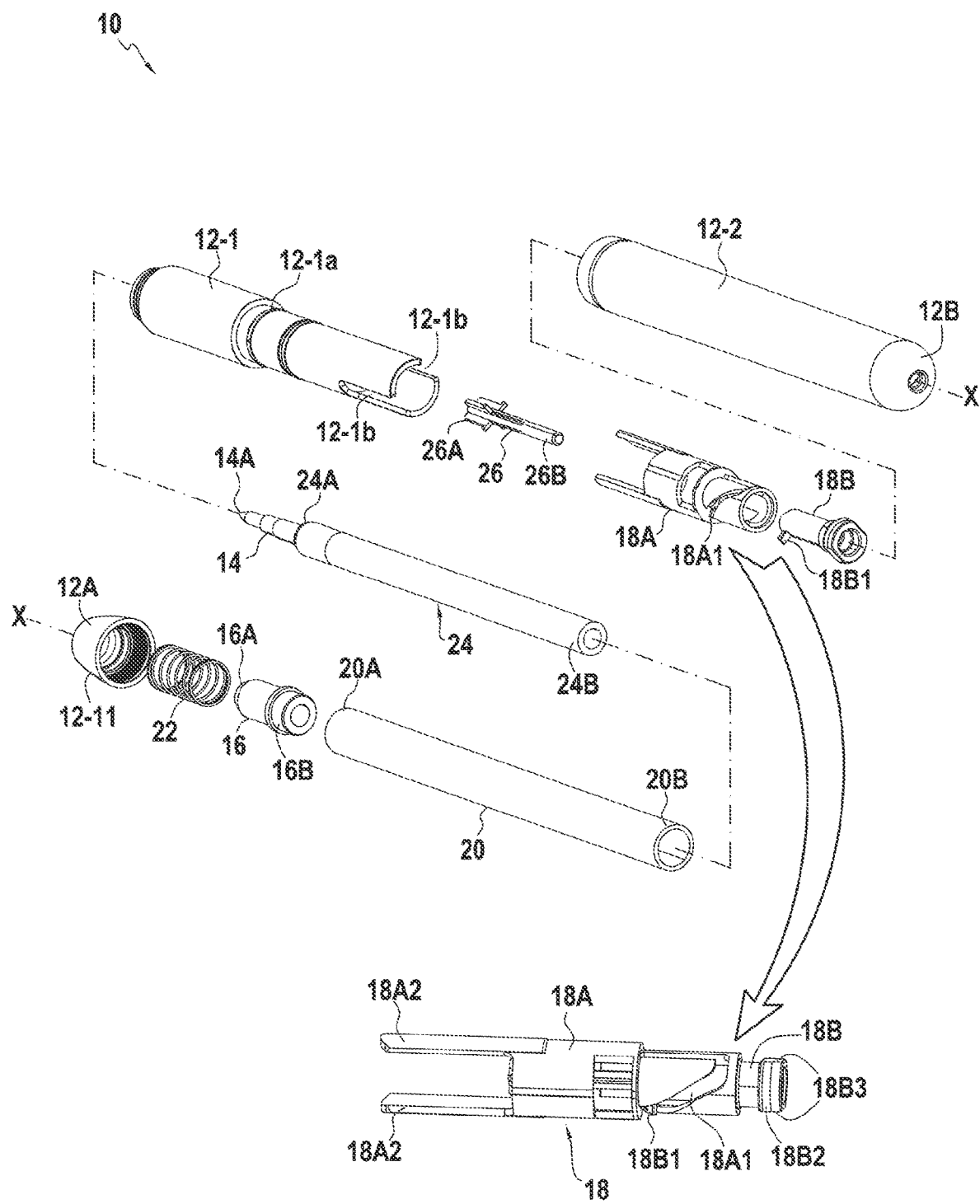
FIG. 2 shows an exploded view of the aqueous peelable ink writing instrument of FIG. 1.
Figure 3:
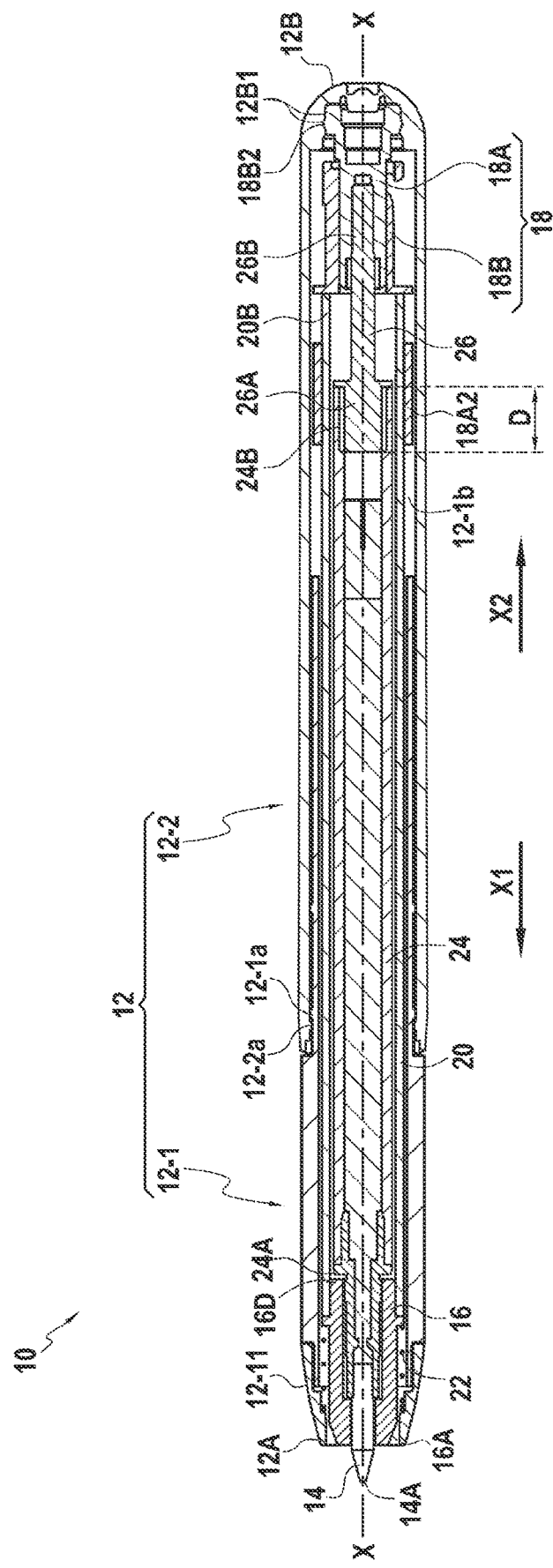
FIG. 3 shows a sectional view of the aqueous peelable ink writing instrument of FIG. 1, in the plane III of FIG. 1.

FIGS. 1, 2 and 3 show an aqueous peelable ink writing instrument 10 comprising a body 12 extending along an axis X. The body 12 has a first end (or front end) 12A and a second end (or rear end) 12B opposed to the first end 12A along the axis X. The first end 12A is provided with a writing tip 14 and with an eraser 16. The writing tip 14 is fed with aqueous peelable ink. The writing tip 14 is fixed with regard to the body 12. The eraser 16 is movable along the axis X with regard to the body 12 (see double-arrow I in FIG. 1). The aqueous peelable ink writing instrument 10 further comprises a helical-cam propelling mechanism 18 (see FIGS. 2 and 3) configured to move the eraser 16 along the axis X between a retracted position (see FIGS. 1, 3 and 4) and a protruding position (see FIG. 5).

The eraser 16 and the writing tip 14 may be coaxial. The eraser 16 may be disposed around the writing tip 14. The eraser 16 may form a sleeve extending along the axis X and configured to receive therein all or part of the writing tip 14. The writing tip 14 may comprise a writing end 14A. When the writing instrument 10 is seen perpendicular to the axis X as in FIGS. 4 to 6, the writing end 14A may be concealed by the eraser 16 when the eraser 16 is in the protruding position (see FIG. 6) and the writing end 14A may free from the eraser 16 when the eraser 16 is in the retracted position (see FIG. 4). When the writing instrument 10 is seen perpendicular to the axis X, the writing end 14A may be free from the eraser 16 when the eraser 16 is in an intermediate position between the protruding position and the retracted position (see FIG. 5). The eraser 16 may have a distal end 16A. The distal end may have a frustoconical shape. This may render the writing easier when the eraser 16 is in the intermediate position.

The eraser 16 may be mounted onto a tube holder 20. In this example, a rear portion 16B (i.e. a portion axially disposed on the side of the second end 12B) of the eraser 16 is press fitted within a front end 20A (i.e. an end axially disposed on the side of the first end 12A) of the tube holder 20.

More particularly, the eraser consists of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

The helical-cam propelling mechanism 18 may comprise a first part 18A having in this example a helical cam 18A1 and a second part 18B having a cam follower 18B1. In this example, the first part 18A may have a single helical cam 18A1 and the second part 18B may have a single cam follower 18B1. As shown in the detailed view of FIG. 2, the cam follower 18B1 is engaged with the cam helical cam 18A1. In the present example, the angular stoke of the helical-cam propelling mechanism 18 may be up to 90°.

The second part 18B may be fixed to the second end 12B, inside the body 12. In this example, the second part 18B may be snap-fitted to the second end 12B. The snap-fitted parts of the second part 18B and of the second end 12B may be configured to cooperate in form fitting manner in order to prevent relative rotation between the second part 18B and the second end 12B around the axis X. A snap-fitting rib 18B2 may be engaged with a snap-fitting groove 12B1 in order to axially couple the second part 18B and the second end 12B while a flat 18B3 of the second part 18B may cooperate in form fitting manner with a complementary flat (not shown) of the second end 12B in order to rotatably couple the second part 18B and the second end 12B around the axis X. In the present example, two flats 18B3 and two complementary flats may be provided. Any other shape may be provided.

The body 12 may comprise a first portion 12-1 having the first end 12A and a second portion 12-2 having the second end 12B. The first portion 12-1 and the second portion 12-2 may be rotatable relative to each other. The first portion 12-1 and the second portion 12-2 may be rotatably snap-fitted. For example, the first portion 12-1 may have a snap-fitting annular rib 12-1*a* rotatably engaged with a complementary snap-fitting annular rib 12-2*a* of the second portion 12-2.

The first part 18A may be rotatably coupled with the first portion 12-1 and axially movable with regard to the first portion 12-1. For example, the first part 18A may comprise two axial projections 18A2 and the first portion 12-1 may comprise two axial recesses 12-1*b*. The two axial projections 18A2 and the two axial recesses 12-1*b* may be slidably engaged with each other axially.

In this example, the first part 18A may be hollow and may receive a rear end 20B of the tube holder 20. The first part 18A may be axially coupled in only a first direction X1 with the eraser 16, via the tube holder 20. In other words, the first part 18A may axially move the eraser 16 only when the first part 18A is moved in a first axial direction X1. The tube holder 20 may axially abut against the first part 18A. In other words, in this example the eraser 16 may abut axially against the first part 18A via the tube holder 20. When the first part 18A is moved in a second axial direction X2, opposite to the first axial direction X1, the first part 18A may be not able to move the eraser 16.

Figure 4:
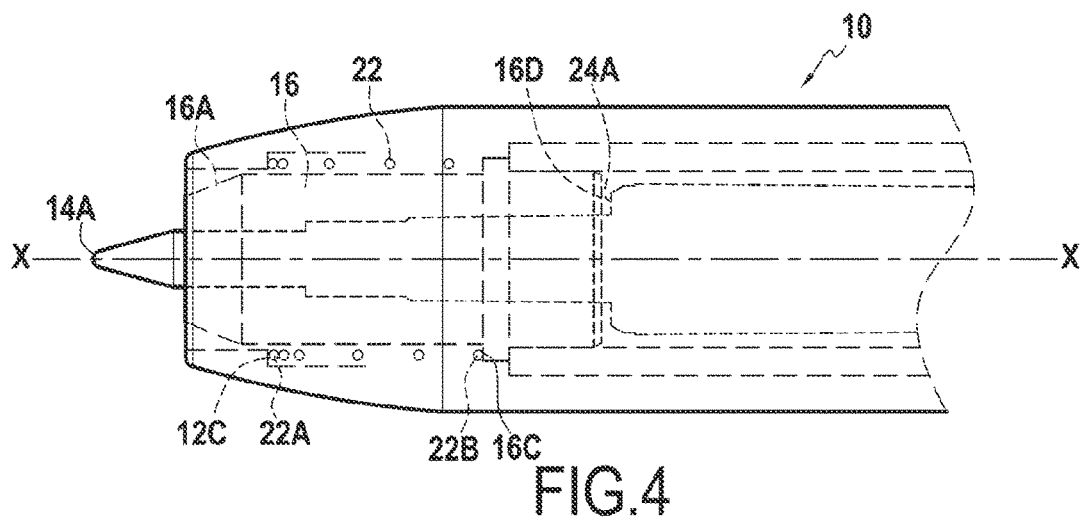
FIG. 4 shows the aqueous peelable ink writing instrument seen perpendicular to the axis X, the eraser being in the retracted position.
Figure 5:
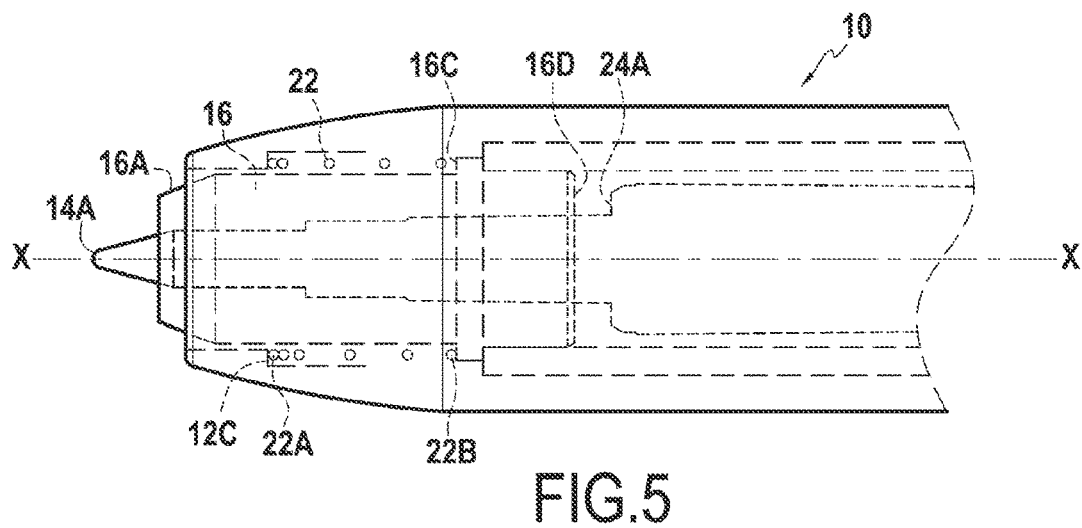
FIG. 5 shows the aqueous peelable ink writing instrument seen perpendicular to the axis X, the eraser being in an intermediate position between the retracted position and the protruding position.
Figure 6:
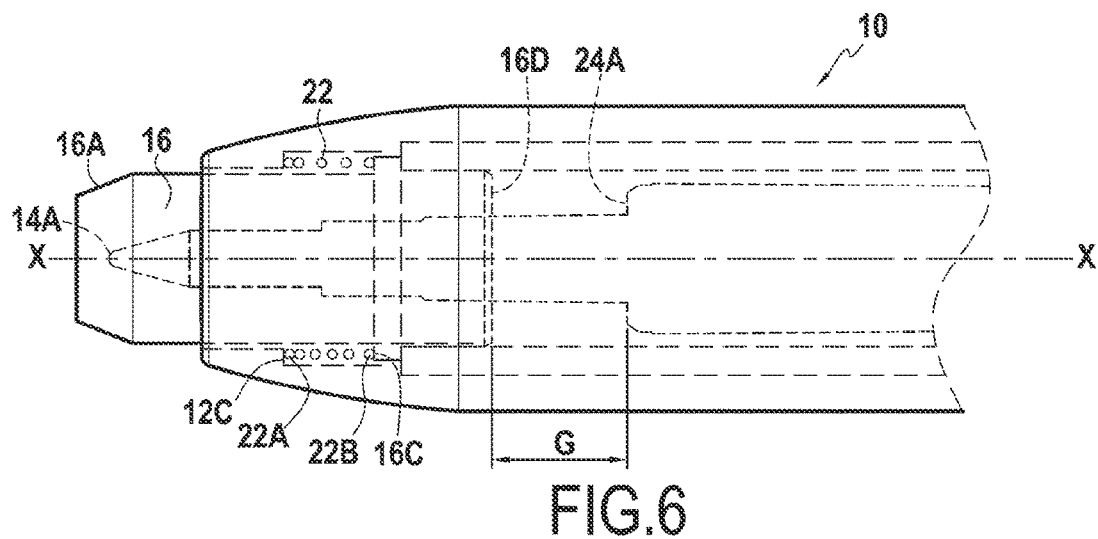
FIG. 6 shows the aqueous peelable ink writing instrument seen perpendicular to the axis X, the eraser being in the protruding position.

A return spring 22 may be configured to axially push the eraser 16 toward the first part 18A. In this example, the return spring 22 may be configured to axially push the eraser 16 from the extended position toward the retracted position, in the second axial direction X2. The return spring 22 may be a coil spring which works in compression. As shown in FIGS. 4 to 6, a first end 22A of the return spring 22 may abut against a first shoulder 12C of the body 12 and a second end 22B, axially opposite to the first end 22A, may abut against a shoulder 16C of the eraser 16. In a variant not shown, the second end 22B may abut against a shoulder of the tube holder 20.

Therefore, in the present example, when the second portion 12-2 of the body 12 is rotated relatively to the first portion 12-1 in the first rotational direction R1 around the axis X shown in FIG. 1, the second part 18B rotates together with the second portion 12-2 and pushes axially the first part 18A via the cam follower 18B1 and the helical cam 18A1 in the first axial direction X1, then pushing the eraser 16 in the first axial direction X1. The eraser 16 is thus moved from the retracted position (see FIG. 4) toward the intermediate and the protruding position (see FIGS. 5 and 6). No button may be needed in order to actuate the eraser 16. The writing instrument 10 may thus be a buttonless writing instrument. The structure of such a writing instrument may be simple and provide better ergonomics on the body.

When the second portion 12-2 of the body 12 is rotated relatively to the first portion 12-1 in the second rotational direction R2, opposite to the first rotational direction R1, as shown in FIG. 1, the second part 18B rotates together with the second portion 12-2 and pushes axially the first part 18A via the cam follower 18B1 and the helical cam 18A1 in the second axial direction X2. The return spring 22 then pushes simultaneously the eraser 16 in abutment, via the tube holder 20, against the first part 18A. The eraser 16 is thus moved from the protruding or intermediate position (see FIGS. 5 and 6) toward the retracted position (see FIG. 4).

In the present example, the writing instrument 10 may comprise a writing body 24, for example a cartridge, which may comprise the writing tip 14. The writing body 24 may also comprise an ink reservoir configured to store aqueous peelable ink. The writing tip 14 may be fed with aqueous peelable ink by the reservoir. The eraser 16 may be a friction body.

The writing body 24 may extend at least in part into the tube holder 20 in any position of the eraser 16. The writing body 24 may be supported, in the tube holder 20 by a support 26.

The support 26 may extend inside the first part 18A and may be axially coupled with the second part 18B. The writing body 24 may be removable mounted to the support 26. For example, a rear end 24B of the writing body may be press fitted to a front portion 26A of the support 26. The support 26 may comprise a rear portion 26B, for example a rod, press fitted to the second part 18B. In an example not shown the support 26 and the second part 18B may be unitarily formed. The support 26 may stop the writing body 24 in the second axial direction X2.

The writing body 24 may have a front shoulder 24A which may abut against a complementary shoulder 16D of the eraser 16. Therefore, if the writing body 24 were to be detached from the support 26, writing body 24 may remain into the body 12. For example, a maximum axial gap G (see FIG. 6) between the front shoulder 24A and the complementary shoulder 16D may be less than a maximum axial stroke D (see FIG. 3) for removing the writing body 24 from the support 26 (or a maximum axial length of the front portion 26A engaged with the writing body 24). In such a case, there is no enough axial space between the two shoulders 24A and 16D for allowing the writing body 24 to be completely detached from the support 26. Therefore, the writing body 24 may remain attached to the support 26 in any configuration of the writing instrument 10.

As shown in FIGS. 4 to 6, the writing tip 14 is fixed with regard to the body 12 while the eraser 16 is movable between a retracted position (see FIG. 4) and a protruding position (see FIG. 6). When the eraser 16 is in the retracted position (see FIG. 4) or in the intermediate position (see FIG. 5) the eraser 16 may not be used and the writing tip 14 may be used for writing. When the eraser 16 is in the protruding position (see FIG. 6), the writing tip 14 is protected by the eraser 16 and may not be used and the eraser 16 may be used for erasing an aqueous peelable ink applied with the writing tip 14.

The body 12 may comprise a nose cone 12-11, the nose cone 12-11 comprising the first end 12A. The nose cone 12-11 may be part of the first portion 12-1. The nose cone 12-11 may be removable from the rest of the body 12. For example, the nose cone 12-11 may be screwed with the first portion 12-1. The nose cone 12-11 may be provided with the shoulder 12C against which the return spring 22 abuts. Thus, when removing the nose cone 12-11, the return spring 22 and the eraser 16 together with the tube holder 20 may be removed and the writing body 24 may be removed for refill.

Throughout the present description and claims, the term "erasable ink" or "peelable ink" or "aqueous peelable ink" is intended to mean any ink which can be peeled (or rubbed) after writing, in examples by the use of a finger or a friction body wherein the friction body may be an eraser or a tissue. The written mark obtained, in particular on cellulosic fibers paper such as paper, e.g. printer paper, and cardboard, by this ink can therefore be peeled just after writing such as less than 10 seconds after writing, even a few days after writing, and also even one month after writing, in particular to change the initial color of the writing in another color (second color).

Hence, once applied the written mark made with the ink composition as disclosed herein can be erased by peeling (or rubbing). In examples, the initial color (first color) may be changed into another color (second color). Therefore, according to embodiments, the ink composition is erasable. In embodiments, the ink composition is peelable from a first color into a second color, which is usually different from the first color. This results in the initial color, as well as the second color (after peeling), being vivid. Throughout the present description and claims, the term "erasable" or "peelable" should be understood as any written mark which can be peeled and/or rubbed after writing, for example by the use of a finger or a friction body wherein the friction body can be an eraser or a tissue.

In addition, the term "porous substrate" is intended to mean substrate that contains pores. The porous substrates may have empty spaces or pores that allow an external matter, like e.g. ink, to penetrate into the substrate.

In examples, the roughness of the substrate can be defined by its air permeability and measured by the standard ISO 8791 (unit: mL·min-1). In embodiments, the air permeability of the porous substrate may range from 50 to 1,000 mL·min-1, specifically from 60 to 400 mL·min-1, and more specifically from 80 to 280 mL·min-1.

In particular, the porous substrate may be chosen among porous substrate comprising cellulosic fibers such as paper, printer paper, or cardboard.

The ink composition as disclosed herein may be irreversibly erased. It is therefore an irreversible peelable ink composition. In embodiments, the ink composition may be an irreversible peelable color-changing ink composition. The term "color-changing ink" is intended to mean that once the color has changed, it is not possible to change it again, and in particular it is not possible to go back to the initial color (first color).

The ink composition as disclosed herein may be a writing ink. Throughout the present description and claims, the term "writing ink" is intended to mean any ink which is intended to be used in a writing instrument, and in particular in a felt-pen, a highlighter, a marker. A writing ink should not be confused or mixed with a printing ink which is used in printing machines and which does not have the same technical constraints, and thus the same specifications. Indeed, a writing ink must not contain solid particles of which the size is greater than the channels of the writing instrument, in order to avoid blocking the writing instrument, which would inevitably lead to writing being irreversibly stopped. It must also dry sufficiently rapidly to avoid smudging the writing medium. It must also avoid what is known as bleeding, i.e. migration over time. Thus, the ink composition as disclosed herein must be suitable for the writing instrument for which it is intended. Thus in examples of the present disclosure ink compositions for porous substrates and comprising: at least a first film-forming elastomeric polymer, at least a second film-forming elastomer polymer, and at least one pigment, and water are foresee. The first film-forming elastomeric polymer (a) is hydrogenated acrylonitrile butadiene rubber (HNBR), and the second film-forming elastomeric polymer (b) is styrene butadiene rubber (SBR).

Throughout the present description and claims, "film-forming" means a polymer capable of forming, by itself a macroscopically continuous film on a substrate, in particular on a porous substrate, and specifically a cohesive film.

The ink composition as disclosed herein is an aqueous ink composition, in particular an aqueous peelable ink composition.

Throughout the present description and claims, "elastomeric" means a polymer that displays rubber-like elasticity, i.e. a deformable, flexible polymer which has viscoelastic properties.

Throughout the present description and claims, a "polymer" is a compound, in particular a large molecule or a macromolecule, corresponding to the repetition of one or more units. The units may be derived from compounds called monomers. In particular the repetition of at least two repeating units, and specifically at least ten repeating units are foreseen.

The film-forming elastomeric polymers (a) and (b) allow the fixation of the ink composition as disclosed herein on the paper, and therefore avoid the written mark (deposit) of the ink to be peeled (i.e. removed) by simply brushing it with another sheet of paper while being erasable or while being able to change its initial color (first color) to another one (second color) (when a colorant is also present in the ink composition of the invention) by peeling with a friction body. The first film-forming elastomeric polymer (a) may be hydrogenated acrylonitrile butadiene rubber (HNBR), for example commercially available under the name Zetpol® 2230LX (Zeon Corporation), Therban® (Brenntag), as well as mixtures thereof. The second film-forming elastomeric polymer (b) may be styrene butadiene rubber (SBR), for example commercially available under the name Europrene® Latice 084 (Versalis), Europrene® Latice B010 (Versalis).

In embodiments, the weight ratio of the at least first film-forming elastomeric polymer (a)/the at least second film-forming elastomeric polymer (b), in particular of the hydrogenated butadiene rubber (HNBR)/the styrene butadiene rubber (SBR) may range from 1:5 to 5:1, in particular a weight ratio from 1:4 to 3:1.

In embodiments, the film-forming elastomeric polymer (a) may represent at least 8% by weight, specifically at least 12% by weight, more specifically at least 16% by weight, and even more specifically at least 20% by weight, relative to the total weight of the ink composition. In embodiments, the content of film-forming elastomeric polymer (a) may range from 8 to 36% by weight, and more specifically from 12 to 32% by weight, relative to the total weight of the ink composition.

In embodiments, the total content of film-forming elastomeric polymers ((a)+(b)) may represent at least 8% by weight, specifically at least 12% by weight, more specifically at least 16% by weight, relative to the total weight of the ink composition.

In embodiments, the total content of film-forming elastomeric polymers may range from 8 to 36% by weight, and more specifically from 12 to 32% by weight, even more specifically 12 to 25% by weight, relative to the total weight of the ink composition.

In embodiments, the total content of the film-forming elastomeric polymer (b) may range from 3 to 25% by weight, specifically from 6 to 20% by weight, relative to the total weight of the ink composition.

In embodiments, the ink composition, in particular the aqueous peelable ink composition, may further comprise at least one third film-forming elastomeric polymer.

The ink composition, in particular the aqueous peelable ink composition as disclosed herein may further comprises a pigment (c) which gives the color to the ink composition. The term "pigment" should be understood as meaning white or colored, mineral or organic particles of any form, which are insoluble in the medium in which they are solubilized, and which are intended to color the ink composition once applied on a porous substrate before peeling. The pigments (c) are also generally contained in a dispersion, where the grinding down or particle size reduction is accompanied by appropriate dispersants to achieve stable dispersions. The pigment (c) may be a pigment dispersion, more specifically chosen in the group consisting of pigment black 7 (such as Flexiverse III black 7 by SunChemical®), pigment blue 15:3 (such as APE FRE BL 15:3 DISP by SunChemical®), pigment red (such as Pigment red 210 by SunChemical®), pigment green 7 (such as Sunsperse Eco green, Flexiverse FD Green, Flexiverse Green 7, Flexiverse HC GRN 7 by SunChemical®), and mixtures thereof. In embodiments, the pigment (b) may be chosen in the group consisting of pigment black 7 (such as Flexiverse III black 7 by SunChemical®), pigment blue 15:3 (such as APE FRE BL 15:3 DISP by SunChemical®), and mixtures thereof.

The pigment (c) may be a pigment dispersion, more specifically chosen in the group consisting of pigment violet 23 (such as Cellusperse® A Violet 4 BP by SunChemical®), pigment yellow 74 (such as FG Yellow 1SL by SunChemical®).

In embodiments, the diameter of the pigment in a pigment dispersion may be less than 1 µm, and specifically less than 0.7 µm.

In embodiments, the content of pigment dispersion (c) may range from 0.1 to 10% by weight, and specifically from 0.5 to 9% by weight, and more specifically from 0.5 to 7% by weight, relative to the total weight of the ink composition.

In examples, the content of pigment (c) may range from 10 to 50% by weight, specifically from 30 to 50% by weight, specifically from 35 to 45% by weight, and more specifically from 38 to 45%, relative to the total weight of the pigment dispersion.

The ink composition, in particular the aqueous peelable ink composition as disclosed herein may further comprise at least one dye, in particular a mixture of dyes, solubilized in water. In embodiments, the ink composition as disclosed herein may be color-changing, which means that a written mark made with the ink composition can change from a first color into a second color by mechanical action, i.e. by peeling the first color.

The term "dyes" should be understood as meaning colored, mineral or organic particles of any form, which are soluble in the medium in which they are solubilized, and which are intended to color the ink composition once applied on a porous substrate after peeling. The presence of a dye in the ink composition as disclosed herein allows for a change of the initial color of the writing in another color by peeling with a finger or a friction body. The dye may be chosen for example in the group consisting of direct dyes (for example C.I direct black 17, 19, 22, 32, 38, 51, 71; C.I direct yellow 4, 26, 44, 50; C.I direct red 1, 4, 23, 31, 37, 39, 75, 80, 81, 83, 225, 226, 227; C.I direct blue 1, 15, 41, 71, 86, 87, 106, 108, 199, and the like), acid dyes (for example C.I acid black 1, 2, 24, 26, 31, 52, 107, 109, 110, 119, 154; C.I acid yellow 1, 7, 17, 19, 23, 25, 29, 38, 42, 49, 61, 72, 78, 110, 127, 135, 141, 142; C.I acid red 8, 9, 14, 18, 26, 27, 33, 35, 37, 51, 52, 57, 82, 83, 87, 92, 94, 111, 129, 131, 138, 186, 249, 254, 265, 276; C.I acid violet 15, 17, 49; C.I acid blue 1, 3, 7, 9, 15, 22, 23, 25, 40, 41, 43, 62, 78, 83, 90, 93, 100, 103, 104, 112, 113, 158; C.I acid green 3, 9, 16, 25, 27; C.I acid orange 56, and the like), food dyes (such as C.I. food yellow 3, and the like), Malachite green (C.I 4200) Victoria blue FB (C.I. 44045) methyl violet FN (C.I. 42535), rhodamine F4G (C.I. 45160), and rhodamine 6GCP (C.I 45160), and mixtures thereof.

When present, the content of the dye(s) may range from 0.1 to 10% by weight, specifically from 0.2 to 8% by weight, and more specifically from 0.3 to 5% by weight, by weight relative to the total weight of the ink composition.

The ink composition, in particular the aqueous peelable ink composition as disclosed herein may also contain water (d) as the solvent.

In examples, the content of water (d) in the ink composition, in particular the aqueous peelable ink composition as disclosed herein may range from 10 to 80% by weight, more specifically from 10 to 70% by weight, and even more specifically from 10 to 60% by weight, in particular from 20 to 60% by weight, relative to the total weight of the ink composition.

The ink composition, in particular the aqueous peelable ink composition as disclosed herein may also contain at least one release agent. The release agent may be free of silicone, for example a polyoxyethylene sorbitan ester, more specifically a polyoxyethylene sorbitan fatty acid ester, even more specifically a polyoxyethylene sorbitan fatty acid ester with a chain of fatty acid in C5-C25, and even more specifically a polyoxyethylene sorbitan fatty acid ester with a chain of fatty acid in C8-C16. In embodiments, the release agent may be a polyoxyethylene sorbitan monolaurate. The polyoxyethylene sorbitan ester may comprise repeating units of ethylene oxide, specifically at least 20 repeating units of ethylene oxide. In embodiments, the polyoxyethylene sorbitan monolaurate may have a weight average molecular weight Mw ranging from 800 to 2,000 g·mol-1, more specifically from 1,000 to 1,500 g·mol-1, and even more specifically of 1,300 g·mol-1, measured by Gel Permeation Chromatography (GPC).

In embodiments, the content of release agent in the ink composition, in particular the aqueous peelable ink composition as disclosed herein may range from 0.1 to 5% by weight, more specifically from 0.1 to 3% by weight, and even more specifically from 0.2 to 3% by weight, relative to the total weight of the ink composition.

The ink composition, in particular the aqueous peelable ink composition as disclosed herein may further contain at least one plasticizer. The plasticizer may be chosen in the group consisting of alcohols, specifically glycerin, benzoate esters, diisobutyrate esters such as trimethyl pentanyl diisobutyrate, and mixtures thereof, and more specifically glycerin, benzoate esters, and mixtures thereof, still more specifically glycerin. In embodiments, the ink composition, in particular the aqueous peelable ink composition as disclosed herein may comprise as plasticizer a mixture of at least one ester and at least one alcohol, wherein the at least one alcohol may have a boiling point higher than 160° C., and more specifically it may be glycerin, i.e. with a boiling point: 290° C.

In embodiments, the content of plasticizer in the ink composition, in particular the aqueous peelable ink composition as disclosed herein may range from 1 to 25% by weight, and more specifically from 8 to 20% by weight, relative to the total weight of the ink composition.

In embodiments, the presence of alcohol such as glycerin leads to improve the cap-off time of the composition.

In embodiments, the ink composition, in particular the aqueous peelable ink composition, may further comprise urea and/or urea derivative(s) and mixtures thereof.

More specifically, the addition of such compound(s) can be used to improve the cap-off the composition, in particular when used in addition to alcohol such as glycerin.

In embodiments, the total content of urea and/or urea derivative(s) may range from 1 to 25% by weight, and more specifically from 8 to 20% by weight, relative to the total weight of the ink composition.

In particular, the urea derivative(s) may be chosen among alkylene urea derivative(s) and/or thio urea derivative(s) and mixtures thereof, more specifically the urea derivative(s) may be chosen among ethylene urea, propylene urea, thio urea and mixtures thereof.

In particular, urea and/or urea derivative(s) may be used alone or as a mixture of two or more thereof.

In embodiments, the ink composition, in particular the aqueous peelable ink composition as disclosed herein may comprise at least one first plasticizer and at least urea and/or urea derivative(s), specifically the first plasticizer may comprise glycerin.

The aqueous ink composition, in particular the aqueous peelable ink composition as disclosed herein may further comprise additional additive(s) known by the skilled person to be usable in aqueous ink compositions, for examples selected in the group consisting of antimicrobial agents, antifungal agents, dispersing agents, wetting agents, pH regulators, and mixtures thereof.

In embodiments, the content of additional additive(s) in the ink composition as disclosed herein may range from 0.1 to 30% by weight, more specifically from 0.1 to 20% by weight, and even more specifically from 0.1 to 10% by weight, relative to the total weight of the ink composition.

The aqueous ink composition, in particular the aqueous peelable ink composition as disclosed herein may contain at least one antimicrobial agent such as methyl paraben, phenoxyethanol, isothiazolinone, 1,2-benzoisothiazolin-3-one, 2-methyl-4-isothiazolin-3-one, and mixtures thereof.

In embodiments, the antimicrobial agent may be present in the aqueous ink composition, in particular the aqueous peelable ink composition as disclosed herein in a content ranging from 0.1 to 5% by weight, and more specifically from 0.1 to 2% by weight, relative to the total weight of the ink composition.

The aqueous ink composition, in particular the aqueous peelable ink composition as disclosed herein may also contain a pH regulator, in examples chosen in the group consisting of ammonia, urea, monoethanolamine, diethanolamine, triethanolamine, alkali metal salts of phosphoric acid such as tripolyphosphate, sodium carbonate and hydroxides of alkali metals such as sodium hydroxide. In particular it may be urea.

The ink composition according to the present disclosure is peelable, specifically by peeling such as by mechanical friction, in particular by the use of a finger or a friction body wherein the friction body is an eraser or a tissue. The ink composition is therefore peelable by the friction of the finger or the eraser.

In embodiments, the eraser used as a friction body may be chosen in the group consisting of ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), polyether based polyurethane (PTU), and mixtures thereof.

In embodiments, the tissue used as a friction body may be chosen in the group consisting of cotton fabric, synthetic fabric and leather fabric, and more advantageously cotton fabric.

The ink composition, in particular the aqueous peelable ink composition as disclosed herein may have a viscosity of 3 to 10 mPa·s, and more specifically of 3 to 7 mPa·s, measured at 20° C. with a Shell Cup #1 marketed by NORCROSS® Corporation. When the viscosity is less than 3 mPa·s, the pigment particles may settle more rapidly in the composition with a risk of ink leakage. Furthermore, when the viscosity is higher than 10 mPa·s, the flow rate of the ink composition is too low and any line was not written.

Although the present disclosure is described with reference to specific examples, it is clear that modifications and changes may be made to these examples without going beyond the general scope of the disclosure. In particular, individual characteristics of the various embodiments shown and/or mentioned may be combined in additional embodiments. Consequently, the description and the drawings should be considered in a sense that is illustrative rather than restrictive.

Additionally, all of the disclosed features of an apparatus may be transposed, alone or in combination, to a method and vice versa.

The invention claimed is:

1. An erasable ink writing instrument comprising a body extending along an axis, the body having a first end and a second end opposed to the first end along the axis, the first end being provided with a writing tip and with an eraser, wherein the writing tip is fed with erasable ink, wherein the writing tip is axially fixed with regard to the body and the eraser is movable along the axis with regard to the body, and the erasable ink writing instrument further comprising a helical-cam propelling mechanism configured to move the eraser along the axis between a retracted position and a protruding position, wherein the helical-cam propelling mechanism comprises a first part and a second part, wherein the erasable ink writing instrument further comprises a writing body having the writing tip, wherein the first part is hollow, a support extends inside the first part and is axially coupled with the second part, and the support supports the writing body, and wherein the writing body is removably mounted to the support.

2. The erasable ink writing instrument according to claim 1, wherein the eraser and the writing tip are coaxial, the eraser being disposed around the writing tip, the writing tip comprising a writing end, and, when the erasable ink writing instrument is seen perpendicular to the axis, the writing end is concealed by the eraser when the eraser is in the protruding position and the writing end is free from the eraser when the eraser is in the retracted position.

3. The erasable ink writing instrument according to claim 1, wherein the first part includes one of a helical cam and a cam follower and the second part includes the other of the helical cam and the cam follower, and the first part is axially coupled in at least one direction with the eraser and the second part is fixed to the second end, inside the body.

4. The erasable ink writing instrument according to claim 1, wherein the second part is snap-fitted with the second end.

5. The erasable ink writing instrument according to claim 1, wherein the body comprises a first portion having the first end and a second portion having the second end, the first portion and the second portion are rotatable relative to each other, and the first part is rotatably coupled with the first portion and axially movable with regard to the first portion.

6. The erasable ink writing instrument according to claim 5, wherein the first part comprises one of at least one axial projection and at least one axial recess, the first portion comprises the other of the at least one axial projection and the at least one axial recess, and the at least one axial projection and the at least one axial recess are slidably engaged with each other axially.

7. The erasable ink writing instrument according to claim 1, wherein the writing body is press-fitted to the support.

8. The erasable ink writing instrument according to claim 1, wherein the support and the second part are unitarily formed.

9. The erasable ink writing instrument according to claim 1, wherein the eraser is mounted onto a tube holder, the eraser is axially coupled in at least one direction with the first part via the tube holder, and the writing body extends at least in part into the tube holder in any position of the eraser.

10. The erasable ink writing instrument according to claim 1, comprising a return spring configured to axially push the eraser toward the first part.

11. The erasable ink writing instrument according to claim 10, wherein the return spring is configured to axially push the eraser from the extended position toward the retracted position while the eraser abuts against the first part axially.

12. The erasable ink writing instrument according to claim 1, wherein the body comprises a nose cone, the nose cone comprises the first end, and the nose cone is removable, due to which the writing body is removable for refill.

13. The erasable in writing instrument according to claim 1, wherein the erasable ink is a peelable ink, the eraser is a friction body, and the erasable ink comprises:
  (a) at least a first film-forming elastomeric polymer,
  (b) at least a second film-forming elastomeric polymer,
  (c) at least one pigment, and
  (d) water.

14. The erasable in writing instrument according to claim 13, wherein a weight of the at least a first film-forming elastomeric polymer the at least a second film-forming elastomeric polymer ranges from 1:5 to 5:1.

15. The erasable in writing instrument according to claim 1, wherein the eraser is mounted onto a tube holder, a rear portion of the eraser being configured to be fitted within a front end of the tube holder.

16. The erasable in writing instrument according to claim 1, wherein the eraser has a distal end having a frustoconical shape.

17. The erasable ink writing instrument of claim 16, wherein the erasable ink has a low viscosity ranging from 3 to 10 mPa·s.

18. The erasable ink writing instrument of claim 16, wherein the erasable ink is an aqueous peelable ink.

19. An erasable ink writing instrument comprising a body extending along an axis, the body having a first end and a second end opposed to the first end along the axis, the first end being provided with a writing tip and with an eraser, wherein the writing tip is fed with erasable ink, wherein the writing tip is axially fixed with regard to the body and the eraser is movable along the axis with regard to the body, and the erasable ink writing instrument further comprising a helical-cam propelling mechanism configured to move the eraser along the axis between a retracted position and a protruding position, wherein the helical-cam propelling mechanism comprises a first part and a second part, wherein the erasable ink writing instrument further comprises a writing body having the writing tip, wherein the first part is hollow, a support extends inside the first part and is axially coupled with the second part, and the support supports the writing body, and wherein the writing body is press-fitted to the support.

20. An erasable ink writing instrument comprising a body extending along an axis, the body having a first end and a second end opposed to the first end along the axis, the first end being provided with a writing tip and with an eraser, wherein the writing tip is fed with erasable ink, wherein the writing tip is axially fixed with regard to the body and the eraser is movable along the axis with regard to the body, and the erasable ink writing instrument further comprising a helical-cam propelling mechanism configured to move the eraser along the axis between a retracted position and a protruding position wherein the helical-cam propelling mechanism comprises a first part and a second part, wherein the erasable ink writing instrument further comprises a writing body having the writing tip, wherein the first part is hollow, a support extends inside the first part and is axially coupled with the second part, and the support supports the writing body, and wherein the support and the second part are unitarily formed.

* * * * *

UNITED STATES PATENT AND TRADEMARK OFFICE
CERTIFICATE OF CORRECTION

PATENT NO. : 11,766,887 B2
APPLICATION NO. : 17/459354
DATED : September 26, 2023
INVENTOR(S) : Laurent Beaucher It is certified that error appears in the above-identified patent and that said Letters Patent is hereby corrected as shown below:

In the Claims

In Claim 13, Column 15, Line 30, please delete "in writing" and insert --ink writing--.

In Claim 14, Column 15, Line 37, please delete "in writing" and insert --ink writing--.

In Claim 14, Column 15, Line 38, after "weight" please insert --ratio--.

In Claim 15, Column 15, Line 41, please delete "in writing" and insert --ink writing--.

In Claim 16, Column 16, Line 1, please delete "in writing" and insert --ink writing--.

Signed and Sealed this
Fifth Day of December, 2023

Katherine Kelly Vidal
*Director of the United States Patent and Trademark Office*